United States Patent
Takada et al.

(10) Patent No.: US 11,841,560 B2
(45) Date of Patent: *Dec. 12, 2023

(54) DEPOLARIZING PLATE

(71) Applicant: Dexerials Corporation, Tokyo (JP)

(72) Inventors: Akio Takada, Sendai (JP); Eiji Takahashi, Tagajo (JP); Nobuyuki Koike, Sendai (JP); Koji Sasaki, Miyagi (JP); Naoki Hanashima, Sendai (JP)

(73) Assignee: Dexerials Corporation, Tokyo (JP)

(*) Notice: Subject to any disclaimer, the term of this patent is extended or adjusted under 35 U.S.C. 154(b) by 169 days.

This patent is subject to a terminal disclaimer.

(21) Appl. No.: 17/178,244

(22) Filed: Feb. 18, 2021

(65) Prior Publication Data

US 2021/0181541 A1    Jun. 17, 2021

Related U.S. Application Data

(63) Continuation of application No. 15/185,305, filed on Jun. 17, 2016, now Pat. No. 11,002,993.

(30) Foreign Application Priority Data

Jun. 18, 2015  (JP) .................... 2015-123101

(51) Int. Cl.
*G02F 1/01* (2006.01)
*G02B 5/30* (2006.01)
(Continued)

(52) U.S. Cl.
CPC ......... *G02F 1/0136* (2013.01); *G02B 5/3083* (2013.01); *G02B 1/14* (2015.01); *G02F 1/1335* (2013.01)

(58) Field of Classification Search
CPC ... G02F 1/0136; G02F 1/1335; G02B 5/3083; G02B 1/14
(Continued)

(56) References Cited

U.S. PATENT DOCUMENTS 11,002,993 B2 *  5/2021  Takada .................. G02B 5/3083
2004/0095637 A1 *  5/2004  Nikolov ............... G02B 5/3083
                                                     359/352
(Continued)

FOREIGN PATENT DOCUMENTS

GB   2527783 A *  1/2016  .......... G02B 5/3083
GB   2527783 A     1/2016
(Continued)

OTHER PUBLICATIONS

Bruce A. Garetz et al., Grain Structure in Block Copolymer Thin Films Studied by Guided Wave Depolarized Light Scattering, Macromolecules, 2005, pp. 4282-4288, vol. 38, No. 10.
(Continued)

*Primary Examiner* — Wyatt A Stoffa
*Assistant Examiner* — Mitchell T Oestreich
(74) *Attorney, Agent, or Firm* — KENJA IP LAW PC

(57) ABSTRACT

Provided is a depolarizing plate having a superior degree of depolarization to conventional depolarizing plates. The depolarizing plate includes a light-transmitting substrate having a surface layer portion in which a fine pattern is provided that includes a plurality of curved lines randomly disposed at a pitch of no greater than a wavelength of light, and that exhibits structural birefringence.

21 Claims, 10 Drawing Sheets

(51) Int. Cl.
  *G02B 1/14* (2015.01)
  *G02F 1/1335* (2006.01)
(58) Field of Classification Search
  USPC .................................................. 359/489.06
  See application file for complete search history.

(56) References Cited

U.S. PATENT DOCUMENTS

| 2010/0245954 | A1 | 9/2010 | Ahling |
| 2012/0080404 | A1* | 4/2012 | Lee ..................... C23F 1/02 216/48 |
| 2013/0177717 | A1 | 7/2013 | Koike et al. |

FOREIGN PATENT DOCUMENTS

| JP | 2004341453 A | 12/2004 |
| JP | 2008257133 A | 10/2008 |
| JP | 2012256024 A | 12/2012 |
| JP | 2014162621 A1 | 10/2014 |
| JP | 2015082035 A | 4/2015 |
| JP | 2015092282 A | 5/2015 |

OTHER PUBLICATIONS

Dec. 1, 2020, Notification of Reasons for Refusal issued by the Japan Patent Office in the corresponding Japanese Patent Application No. 2020-021885.

Dec. 17, 2019, Notification of Reasons for Refusal issued by the Japan Patent Office in the corresponding Japanese Patent Application No. 2015-123101.

Mar. 5, 2019, Notification of Reasons for Refusal issued by the Japan Patent Office in the corresponding Japanese Patent Application No. 2015-123101.

Zhuangxi Fang et al., Measurement and Analysis of the Angular Guided-Wave Depolarized Light Scattering Patterns from Block Copolymer Thin Films, Macromolecules, 2010, pp. 10071-10077, vol. 43, No. 23.

* cited by examiner

I-I cross-section

Quartz

Quartz + Al 60 nm

Quartz + Ti 35 nm

Quartz + Cr 50 nm

Etching time 100 sec

Etching time 200 sec

Etching time 300 sec

Molecular mass: 66,000, Average period length: 48 nm

Molecular mass: 152,000, Average period length: 80 nm

DEPOLARIZING PLATE

CROSS-REFERENCE TO RELATED APPLICATION

This application is a continuation of U.S. application Ser. No. 15/185,305 filed Jun. 17, 2016, which claims priority of Japanese Patent Application No. 2015-123101 filed Jun. 18, 2015. The disclosures of the prior applications are hereby incorporated by reference herein in their entirety.

TECHNICAL FIELD

The present disclosure relates to a depolarizing plate that can depolarize light in a specific polarized state when the light is incident thereon, an optical device and a liquid-crystal display device including the depolarizing plate, and a depolarizing plate production method.

BACKGROUND

In a situation in which an optical device, such as a spectroscope, an amplifier, or a measuring instrument, exhibits polarization dependence, the optical device may suffer from reduced output or the like due to this polarization dependence when light in a specific polarized state is incident thereon and thus may not be able function adequately as an optical device. Therefore, a depolarizing plate is used to depolarize the polarized state before the light is incident on the optical device exhibiting polarization dependence.

In a conventionally used depolarizing plate, the thickness of birefringent crystals in an irradiated surface is varied in order to vary the amount of retardation in the surface. When a depolarizing plate is produced using birefringent crystals, the size of depolarizing plate that can be produced is dependent on the size of the crystals. Furthermore, variation in the thickness of a birefringent layer inevitably leads to a change in direction of incident light due to light refraction. For this reason, depolarizing plates in which regions in an irradiated surface are partitioned through patterning by photolithography have come into use.

For example, PTL 1 discloses a depolarizing element including a plurality of structures that each exhibit structural birefringence through provision, in a surface layer portion of a substrate, of two media of differing refractive index in an alternating stripe shape having a periodicity shorter than a wavelength of light, wherein the structures are disposed in a flat plane such that optical axes thereof are oriented in different directions in the same plane. According to PTL 1, when the described depolarizing plate is used, in a situation in which incident light is light that is polarized in a specific direction, the incident light passes through each of the structures such that outgoing light is a mixture of light polarized in different directions in accordance with the orientations of the optical axes of the structures, as a result of which, the incident polarized light is depolarization.

CITATION LIST

Patent Literature

PTL 1: JP 2004-341453 A

SUMMARY

However, it is not possible to achieve sufficient depolarization using the depolarizing plate described in PTL 1 because the plurality of stripe-shaped structures are provided such that the optical axes thereof are oriented in different directions in the same plane and thus each of the structures becomes a partitioned region such that a phase difference in the partitioned region is the same. Furthermore, pattern formation becomes more difficult if the partitioned regions (structures) are made smaller in order to obtain greater depolarization and even if the structures are randomly disposed, there is a limit to this randomness and a degree of regularity remains. Moreover, the partitioned regions in the depolarizing plate described in PTL 1 are formed by straight line shapes, which may lead to light diffraction depending on the pitch of the lines and may adversely affect optical properties. When the described depolarizing plate is used in a liquid-crystal display device, moire or diffraction may occur, leading to reduced image quality.

In consideration of the above, an objective of the present disclosure is to provide a depolarizing plate having a superior degree of depolarization to conventional depolarizing plates. Another objective of the present disclosure is to provide an optical device and a liquid-crystal display device including the depolarizing plate and a method for producing the depolarizing plate.

The inventors conducted diligent investigation in order to achieve the various objectives described above. Pattern forming techniques for partitioning regions in the surface of a depolarizing plate have their limitations and it is difficult to form a fine pattern randomly throughout the entire surface. The inventors realized that an improvement in the degree of depolarization can be obtained by providing a fine pattern including a plurality of curved lines randomly disposed at a pitch of no greater than a wavelength of light throughout the entire surface of a depolarizing plate such as to exhibit structural birefringence. This led to the present disclosure.

The present disclosure is based on the above findings by the inventors and provides the following as a means for solving the various problems described above. Specifically, the present disclosure provides:

<1> A depolarizing plate comprising a light-transmitting substrate having a surface layer portion in which a fine pattern is provided that includes a plurality of curved lines randomly disposed at a pitch of no greater than a wavelength of light, and that exhibits structural birefringence.

The fine pattern is provided randomly throughout the surface in the depolarizing plate described in <1>, and thus a depolarizing plate having a superior degree of depolarization can be provided.

<2> The depolarizing plate described in <1>, further comprising a protective film covering the surface layer portion of the light-transmitting substrate.

<3> A depolarizing plate comprising:
a light-transmitting substrate; and
a thin film disposed on a surface of the light-transmitting substrate and made from a material having a different refractive index from the light-transmitting substrate, wherein
a fine pattern is provided in at least the thin film out of the thin film and a surface layer portion of the light-transmitting substrate, the fine pattern including a plurality of curved lines randomly disposed at a pitch of no greater than a wavelength of light, and exhibiting structural birefringence.

The fine pattern is provided randomly throughout the surface in the depolarizing plate described in <3>, and thus a depolarizing plate having a superior degree of depolarization can be provided.

<4> The depolarizing plate described in <3>, wherein the fine pattern is only provided in the thin film.

<5> The depolarizing plate described in <3>, wherein the fine pattern is provided in both the thin film and the surface layer portion of the light-transmitting substrate.

<6> The depolarizing plate described in any one of <3> to <5>, wherein the thin film is formed by oblique vapor deposition or oblique sputtering.

<7> The depolarizing plate described in any one of <3> to <6>, wherein the thin film is made from an inorganic oxide.

<8> The depolarizing plate described in any one of <3> to <7>, wherein the thin film includes any of Si, Al, Ta, Ti, and Nb.

<9> The depolarizing plate described in any one of <3> to <8>, further comprising a protective film covering the thin film.

<10> The depolarizing plate described in <2> or <9>, wherein the protective film includes at least one selected from the group consisting of $SiO_2$, $Ta_2O_5$, $TiO_2$, $Al_2O_3$, $Nb_2O_5$, LaO, and $MgF_2$.

<11> The depolarizing plate described in any one of <1> to <10>, wherein at least one of the plurality of curved lines includes a U-shaped curved section.

<12> The depolarizing plate described in any one of <1> to <11>, wherein at least one of the plurality of curved lines branches.

<13> The depolarizing plate described in any one of <1> to <12>, wherein retardation due to the structural birefringence is at least ¼ of a maximum wavelength of the light.

<14> The depolarizing plate described in <13>, wherein at least a region in which the retardation varies continuously is present in the surface of the light-transmitting substrate.

<15> The depolarizing plate described in any one of <1> to <14>, wherein the fine pattern is formed by pattern transfer of a block copolymer.

<16> An optical device including the depolarizing plate described in any one of <1> to <15>.

Through the optical device described in <16>, an optical device having superior optical properties can be provided.

<17> A liquid-crystal display device including the depolarizing plate described in any one of <1> to <15>.

Through the liquid-crystal display device described in <17>, a liquid-crystal display device having superior display properties can be provided.

<18> A depolarizing plate production method comprising:
providing a neutral layer above a light-transmitting substrate;
providing a pattern formation layer on a surface of the neutral layer;
phase separating the pattern formation layer to from a fine pattern having a lamellar structure oriented perpendicularly to a surface of the light-transmitting substrate and including a plurality of curved lines randomly disposed at a pitch of no greater than a wavelength of light; and
transferring the fine pattern to a surface layer portion of the light-transmitting substrate in conjunction to removal of the neutral layer and the pattern formation layer.

Through the production method described in <18>, a method can be provided that enables simple production of a depolarizing plate having a superior degree of depolarization.

<19> The depolarizing plate production method described in <18>, further comprising
providing an etching mask layer on the surface of the light-transmitting substrate in advance of the providing of the neutral layer, wherein
the etching mask layer is also removed in the transferring.

<20> A depolarizing plate production method comprising:
forming a thin film on a surface of a light-transmitting substrate from a material having a different refractive index from the light-transmitting substrate;
providing a neutral layer above the thin film;
providing a pattern formation layer on a surface of the neutral layer;
phase separating the pattern formation layer to form a fine pattern having a lamellar structure oriented perpendicularly to the surface of the light-transmitting substrate and including a plurality of curved lines randomly disposed at a pitch of no greater than a wavelength of light; and
transferring the fine pattern to at least the thin film out of the thin film and a surface layer portion of the light-transmitting substrate in conjunction to removal of the neutral layer and the pattern formation layer.

Through the production method described in <20>, a method can be provided that enables simple production of a depolarizing plate having a superior degree of depolarization.

<21> The depolarizing plate production method described in <20>, wherein in the transferring, the fine pattern is only formed in the thin film.

<22> The depolarizing plate production method described in <20>, wherein in the transferring, the fine pattern passes through the thin film to the surface layer portion of the light-transmitting substrate such as to be formed in both the thin film and the surface layer portion of the light-transmitting substrate.

<23> The depolarizing plate production method described in any one of <20> to <22>, further comprising
providing an etching mask layer on a surface of the thin film in advance of the providing of the neutral layer, wherein
the etching mask layer is also removed in the transferring.

<24> The depolarizing plate production method described in any one of <18> to <23>, wherein the fine pattern is formed by a block copolymer.

According to the present disclosure, the various conventional problems described above can be solved and the objectives described above can be achieved by providing a depolarizing plate having a superior degree of depolarization to conventional depolarizing plates, an optical device and a liquid-crystal display device including the depolarizing plate, and a depolarizing plate production method.

DETAILED DESCRIPTION

The following provides a specific description of the present disclosure with reference to the drawings. Note that in FIGS. 1 and 3-6, the depth and pitch width of fine patterns and sizes of structures are exaggerated in order to facilitate explanation and thus differ from reality. Also, equivalent structural elements are, as a rule, assigned the same reference number and explanation thereof is omitted.

(Depolarizing Plate)

A depolarizing plate according to the present disclosure includes a light-transmitting substrate having a surface layer portion in which a fine pattern is provided that exhibits structural birefringence, and may include other structures as required.

<Depolarizing Plate>

Figure 1A:
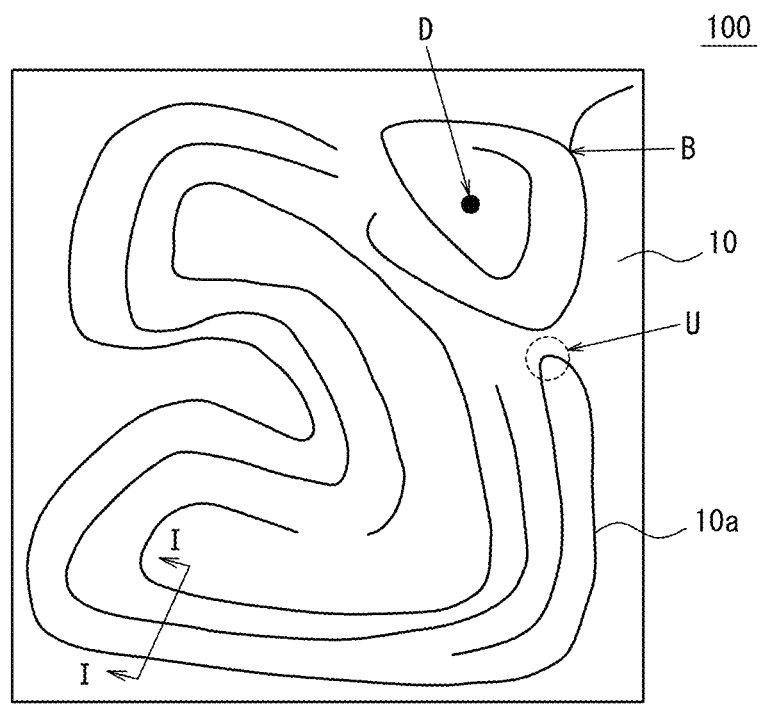
FIG. 1A is a plan view from a side of a depolarizing plate according to an embodiment of the present disclosure at which a fine pattern is provided.

As illustrated in FIG. 1A, a depolarizing plate 100 according to an embodiment of the present disclosure includes a light-transmitting substrate 10 having a surface layer portion in which a fine pattern 10a is provided and may include other structures as required.

Herein, the fine pattern 10a includes a plurality of curved lines randomly disposed at a pitch of no greater than a wavelength of light and exhibits structural birefringence.

<<Light-Transmitting Substrate>>

The light-transmitting substrate 10 may be selected as appropriate depending on the objective, without any specific limitations other than being a material that can transmit light that is to be depolarized. The material of the light-transmitting substrate may for example be quartz, glass, crystal, or sapphire.

<<Fine Pattern>>

Figure 1B:
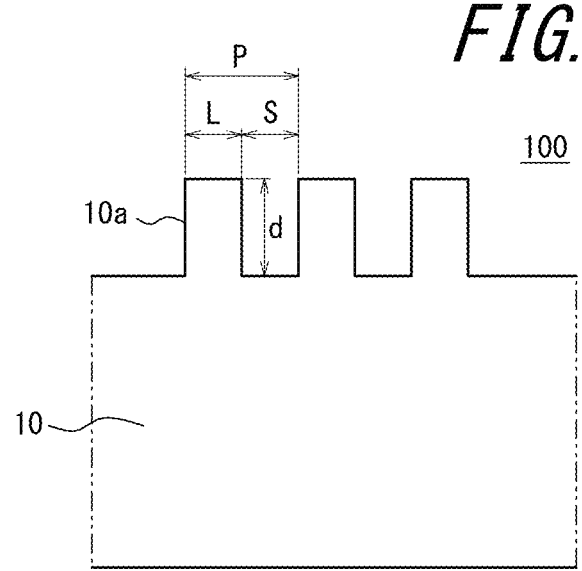
FIG. 1B is a cross-sectional view I-I indicated in FIG. 1A.

FIG. 1A is a plan view schematically illustrating the depolarizing plate 100 as viewed from a side at which the fine pattern 10a is provided and FIG. 1B is a cross-sectional view I-I indicated in FIG. 1A. As illustrated in FIGS. 1A and 1B, the fine pattern 10a is provided in the surface layer portion of the light-transmitting substrate 10 and can exhibit structural birefringence through inclusion of the plurality of curved lines randomly disposed at a pitch P of no greater than a wavelength of light. Note that a "curved line" referred to in the present description may include a linear curve (straight line) as one section of the line, but is not a line composed entirely of a straight line or a polygonal line. Furthermore, as illustrated in FIG. 1B, P=L+S, where L represents the width of lands in the fine pattern 10a that each have a protruding shape and S represents the width of grooves that each have a recessed shape composed of an air layer between adjacent protrusions. However, the pitch P is of course not fixed since the curved lines are randomly disposed. Note that d represents the depth of the grooves.

As illustrated in FIG. 1A, any of the plurality of curved lines included in the fine pattern 10a may freely include a U-shaped curved section U. Moreover, as illustrated in FIG. 1A, any of the plurality of curved lines may freely branch. Such branching is illustrated as a branching point B in FIG. 1A. Furthermore, besides the curved lines, the fine pattern 10a may also include a spot-shaped portion D. Polarized light that is incident on the depolarizing plate 100 can be depolarized as a result of the fine pattern 10a being provided randomly throughout the entire surface of the surface layer portion of the light-transmitting substrate 10.

Figure 2A:
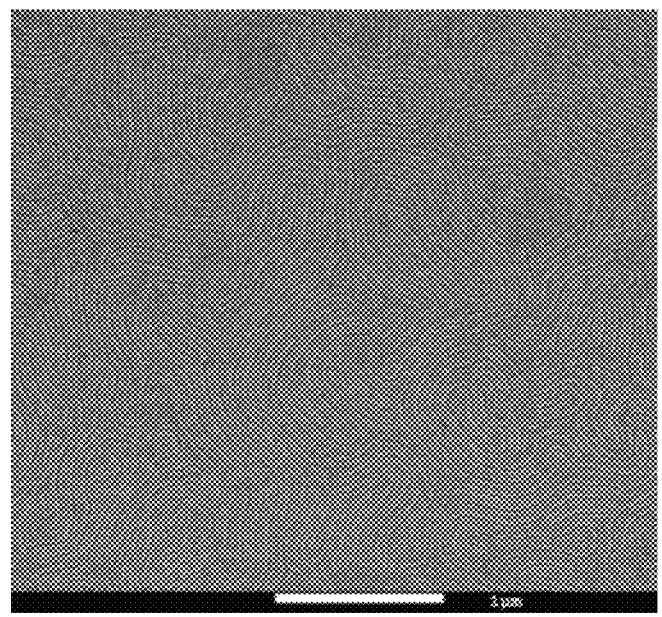
FIG. 2A is a plan view SEM image of a specific example of a fine pattern according to the present disclosure.
Figure 2B:
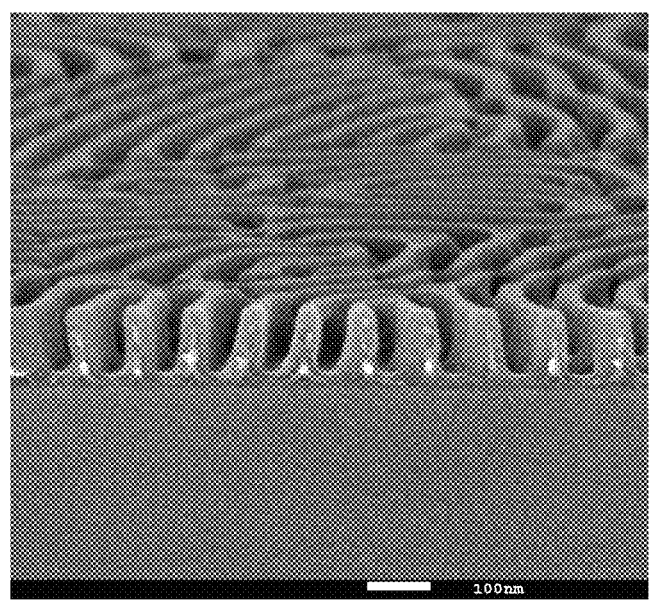
FIG. 2B is a cross-sectional photograph of the example shown in FIG. 2A.

The following explains a specific example of the fine pattern 10a. FIG. 2A is a plan view SEM photograph of a block copolymer pattern and FIG. 2B is a cross-sectional SEM photograph of the same. The fine pattern 10a can for example be formed by providing a block copolymer pattern above the light-transmitting substrate 10 and performing pattern transfer to the surface layer portion of the light-transmitting substrate 10. Note that more detailed description is provided in production method embodiments further below. The fine pattern 10a enables random optical axis orientation throughout the surface such that incident polarized light can be depolarized. Explanation of how the fine pattern 10a is formed is provided further below in the production method embodiments.

The depolarizing plate according to the present disclosure is made only from inorganic materials and is therefore more appropriate than conventional depolarizing plates for high-brightness applications in which heat and light resistance are required, such as in an LCD projector. Furthermore, interface scattering and the like can be prevented because retardation varies continuously in the substrate surface.

It is preferable that retardation due to structural birefringence of the depolarizing plate 100 is at least ¼ of a maximum wavelength of incident light and that the fine pattern 10a is provided such that at least a region in which the retardation varies continuously is present in the surface of the light-transmitting substrate 10. Moreover, the aforementioned region in the surface in which the retardation varies continuously more preferably dominates. The amount of retardation can be adjusted by appropriately selecting the depth of fine pattern grooves, the pitch P, and the light-transmitting substrate material. Furthermore, continuous variation of the retardation in the surface can be adjusted by changing, for example, the underlayer (neutral layer) selected in fine pattern formation, which is described further below, annealing conditions, and molecular mass.

Note that the size of the depolarizing plate according to the present embodiment, the pitch P of the fine pattern 10a, the groove depth d, and so forth are not specifically limited so long as they allow depolarization of desired incident polarized light and are matter that should be designed as appropriate when the depolarizing plate is to be adopted in an optical device, liquid-crystal display device, or the like. Although the groove depth d is typically of the order of hundreds of nanometers in order to ensure sufficient retardation, the groove depth d may be freely set so long as the material of the light-transmitting substrate 10 is appropriately selected to allow depolarization to be achieved with a desired degree of depolarization.

<<Thin Film>>

Figure 3A:
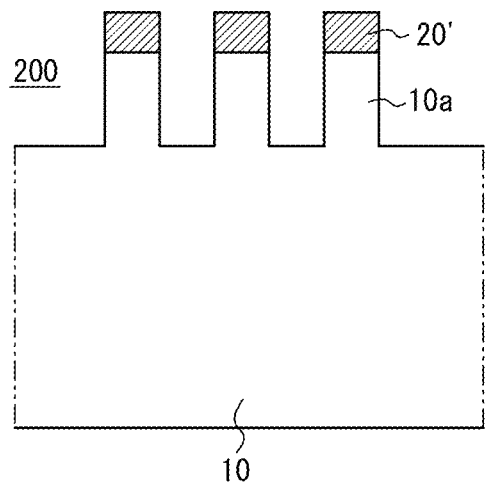
FIG. 3A is a schematic cross-sectional view of a depolarizing plate according to an embodiment of the present disclosure in which a thin film is provided.

As illustrated in FIG. 3A, a depolarizing plate 200 according to another embodiment of the present disclosure may further include a thin film 20' (may also be referred to as a thin film-derived portion) on the surface of the light-transmitting substrate 10 that is made from a different material from the light-transmitting substrate 10. In other words, the depolarizing plate 200 according to the present embodiment includes a light-transmitting substrate 10 and a thin film 20' disposed on the light-transmitting substrate surface and made from a material having a different refractive index from the light-transmitting substrate, and a fine pattern is provided in at least the thin film 20' out of the thin film 20' and a surface layer portion of the light-transmitting substrate 10, the fine pattern including a plurality of curved lines randomly disposed at a pitch of no greater than a wavelength of light and exhibiting structural birefringence. Note that the fine pattern referred to here has the same shape as previously explained for the depolarizing plate 100.

Figure 3B:
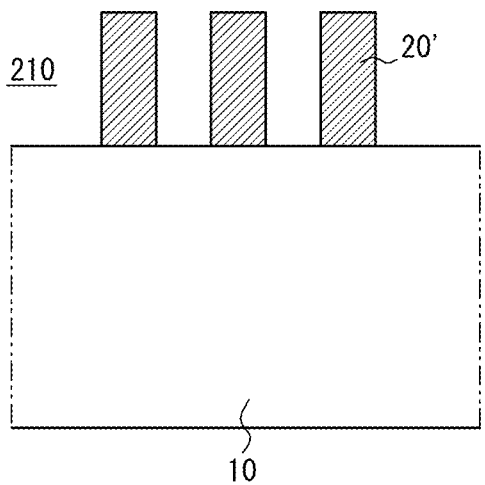
FIG. 3B is a schematic cross-sectional view of a depolarizing plate according to another embodiment of the present disclosure in which a thin film is provided.

The fine pattern may be provided in both the thin film 20' and a surface layer portion 10a of the light-transmitting substrate 10 (FIG. 3A), or may be provided only in the thin film 20' (FIG. 3B). Depolarizing plates 200 and 210 can both depolarize polarized light in the same way as previously explained for the depolarizing plate 100. Note that compared to the previously explained depolarizing plate 100, the present embodiment is more preferable in terms that the amount of retardation can be controlled by adjusting the refractive index through the thickness, material, and so forth of the thin film 20'. Moreover, the present embodiment is also preferable because the film thickness for implementing a required amount of retardation R can be thin. The shape of the thin film 20' of the depolarizing plate 210 illustrated in FIG. 3B can be set through appropriate selection of a light-transmitting substrate 10, a thin film 20, an etching liquid, and so forth in a transfer step described further below and by using the light-transmitting substrate 10 as a so-called "etching stop layer." This is preferable in terms that the amount of retardation can be accurately controlled.

If the amount of retardation R satisfies R>170 nm, at least a portion of linearly polarized red light, which has a longest wavelength among visible light, can be converted to circularly polarized light. The following provides specific explanation of the thickness of the thin film 20' using an example in which a silicon oxide having a refractive index of approximately 1.46 is used as a thin film material. In a situation in which structural birefringence is obtained through an alternating structure of two different types of media in the form of the thin film and an air layer (refractive index 1) corresponding to grooves between the curved lines of the fine pattern, the thickness of the thin film is required to be approximately 2.0 μm since the amount of birefringence Δn is approximately 0.08. The material and thickness of the thin film should be selected as appropriated depending on the wavelength of incident light and the desired amount of retardation R.

The thin film 20' has a different refractive index to the light-transmitting substrate 10. The material of the thin film 20' may be selected as appropriate depending on the objective, without any specific limitations other than having a higher refractive index than the light-transmitting substrate 10. The thin film is preferably made from an inorganic oxide, and more preferably includes any of Si, Al, Ta, Ti, and Nb. For example, the thin film can be made from silicon oxide, aluminum oxide, titanium oxide, niobium oxide, or tantalum oxide.

Figure 3C:
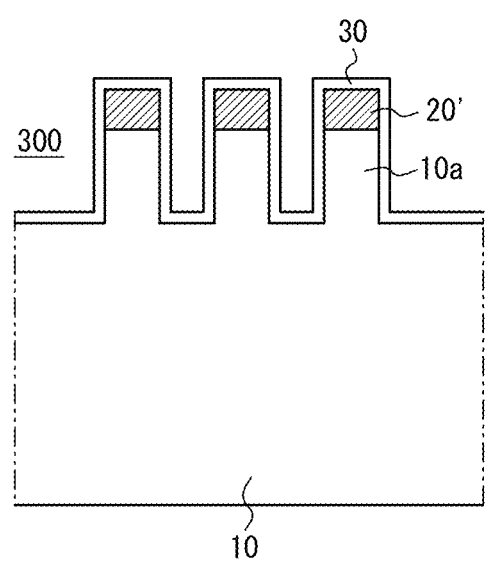
FIG. 3C is a schematic cross-sectional view illustrating a depolarizing plate according to another embodiment of the present disclosure in which a protective film is further provided in the embodiment illustrated in FIG. 3A.
Figure 3D:
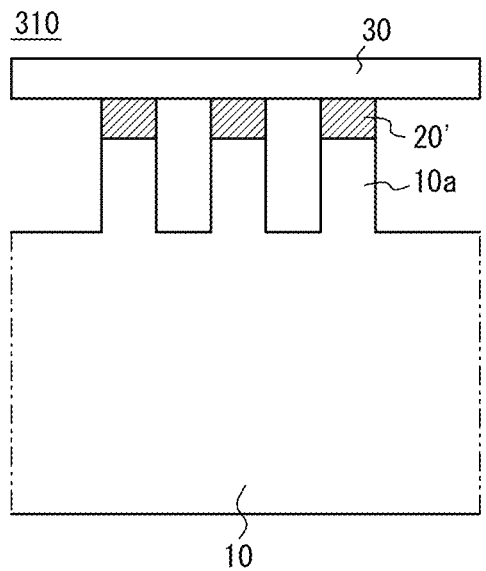
FIG. 3D is a schematic cross-sectional view illustrating a depolarizing plate according to another embodiment of the present disclosure in which a protective film is further provided in the embodiment illustrated in FIG. 3A.

On the other hand, in another preferable embodiment, a depolarizing plate 300 includes a thin film 20' that is preferably formed by oblique vapor deposition or oblique sputtering. The thin film formed by oblique vapor deposition or oblique sputtering exhibits birefringence and has a highly porous structure for obtaining high birefringence. Furthermore, the thin film has a column-shaped structure with a low density and includes gaps with a volume ratio of from 20% to 30%. Accordingly, the thin film has a high tendency to absorb atmospheric moisture and exhibit fluctuations in optical properties such as transmittivity and phase difference. Although the main component of the gaps straight after thin film formation is air (refractive index 1.0), atmospheric moisture (refractive index 1.3) is subsequently taken in at room temperature, causing fluctuations in optical properties. Furthermore, the moisture that has been taken in evaporates when exposed to an ambient temperature of 100° C. or higher, causing air to once again become the main component of the gaps. In this manner, temperature dependent changes in the amount of moisture in the thin film formed by oblique vapor deposition or oblique sputtering cause changes in the refractive index of the gaps. The birefringence also changes as a result, leading to fluctuations in transmittivity and phase difference. It is particularly preferable that the top and side surfaces of the thin film formed by oblique vapor deposition or oblique sputtering are covered by a highly compact protective film 30 as illustrated in FIG. 3C. Formation of the protective film 30 can prevent atmospheric moisture from entering and leaving the thin film, and can improve moisture resistance.

A material of the protective film 30 can for example be made using an inorganic compound having low moisture permeability such as $SiO_2$, $Ta_2O_5$, $TiO_2$, $Al_2O_3$, $Nb_2O_5$, LaO, or $MgF_2$. The material of the protective film 30 preferably includes at least one of these inorganic compounds and is preferably composed of any one of these inorganic compounds. The protective film 30 may be formed using a method that enables formation of a protective film having low moisture permeability through dense formation of any of the above inorganic compounds. For example, the protective film 30 can be formed by chemical vapor deposition (CVD). In formation of the protective film by CVD, a substrate having a birefringent layer formed thereon is loaded into a vessel having a pressure of from atmospheric pressure to medium vacuum pressure (100 Pa to $10^{-1}$ Pa), a gaseous inorganic compound is fed into the vessel as a material for the protective film, and a reaction is caused to occur between the gaseous inorganic compound and the birefringent layer by providing energy in the form of heat, plasma, light, or the like. According to the CVD method described above, the inorganic compound can be densely formed above the birefringent layer to obtain a protective film having low moisture permeability. Note that besides the CVD method described above, the film formation method of the protective film can be freely selected from among methods that enable dense formation of an inorganic compound, such as plasma assisted vapor deposition and sputtering.

The protective film 30 is not limited to a situation in which the thin film 20' is formed by oblique vapor deposition or oblique sputtering, and can be appropriately adopted even in a situation in which the thin film 20' is formed by any other freely selected method. A water-repellant film of triethoxycaprylylsilane (for example, OTS commercially available from Daito Kasei Kogyo Co., Ltd.), fluorodecyltrichlorosilane (FDTS), or the like may be used as the protective film 30. As illustrated for a depolarizing plate 310 in FIG. 3D, a protective film 30 made from a transparent material such as $SiO_2$ or $Al_2O_3$ may be formed such as to cover a thin film 20' like a lid. In the depolarizing plate 300, the protective film 30 covers the thin film 20', whereas in the previously described depolarizing plate 100, a protective film 30 preferably directly covers (i.e., not via a thin film 20' or the like) the surface layer portion of the light-transmitting substrate 10. This can prevent optical properties from varying due to entry of moisture or the like.

(Optical Device)

An optical device according to the present disclosure includes at least the depolarizing plate according to the present disclosure and may further include other structures as required.

(Liquid-Crystal Display Device)

A liquid-crystal display device according to the present disclosure includes at least the depolarizing plate according to the present disclosure and may further include other structures as required.

(Depolarizing Plate Production Method)

The following describes an embodiment of a depolarizing plate production method according to the present disclosure. It will be appreciated that the embodiment described below is merely one embodiment of a method for producing the depolarizing plate according to the present disclosure and that the depolarizing plate according to the present disclosure may be produced according to other embodiments.

Figure 4:
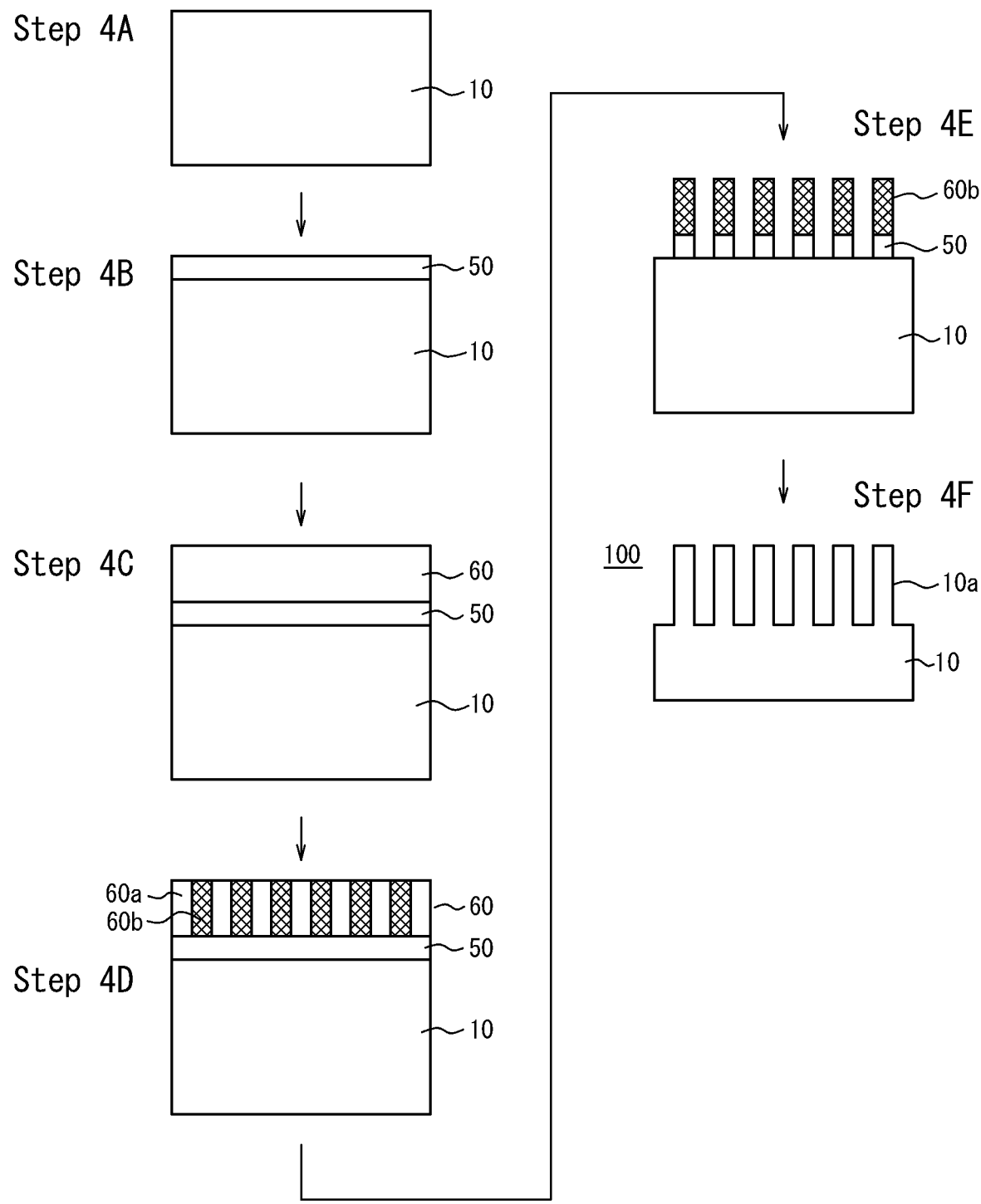
FIG. 4 illustrates a flowchart of a depolarizing plate production method according to an embodiment of the present disclosure.
Figure 5:
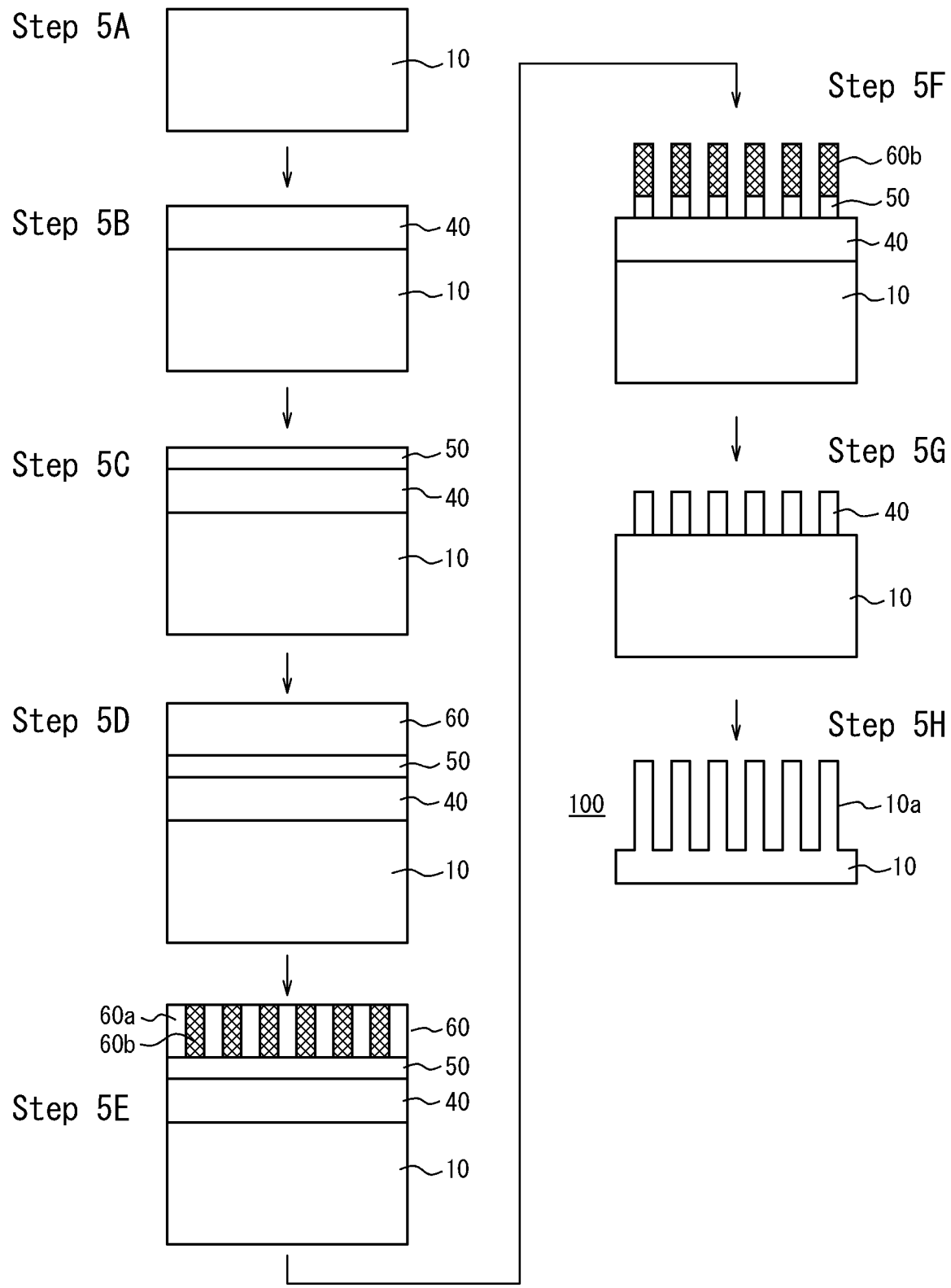
FIG. 5 illustrates a flowchart of a depolarizing plate production method according to a preferable embodiment of the present disclosure.

The embodiment of the depolarizing plate production method according to the present disclosure will be described with reference to FIG. 4. The present embodiment includes steps of providing a neutral layer (Steps 4A and 4B), steps of providing a pattern formation layer (Steps 4B and 4C), steps of forming a fine pattern (Steps 4C and 4D), and transfer steps (Steps 4D-4F), and may further include other steps that are appropriately selected as required.

<Neutral Layer Provision Step>

The step of providing a neutral layer (Step 4B) involves forming a neutral layer 50 on a light-transmitting substrate 10. Note that the previously described light-transmitting substrate 10 is prepared in advance (Step 4A).

<<Neutral Layer>>

The neutral layer 50 may be selected as appropriate depending on the objective, without any specific limitations other than being a layer that allows formation of a perpendicularly oriented lamellar structure in a pattern formation layer in the step of forming a fine pattern described in detail further below. The material of the neutral layer 50 is dependent on the material of the pattern formation layer, but may for example be PS-r-PMMA, which is a random polymer of polystyrene (PS) and polymethyl methacrylate (PMMA). The neutral layer 50 can for example be formed by diluting the PS-r-PMMA in an organic solvent such as toluene to form a 0.5 mass % to 3.0 mass % solution which is then applied onto the surface of the light-transmitting substrate 10 by spin casting and thermally annealed. The organic solvent is of course not limited to toluene and other examples thereof include propylene glycol monomethyl ether acetate (PGMEA) and cyclohexanone. Although no specific limitations are placed on the various conditions during formation of the neutral layer 50, the spin casting can for example be performed at from 3,000 rpm to 6,000 rpm for from 15 s to 60 s, and the thermal annealing can for example be performed under vacuum conditions of no greater than 10 kPa in a temperature range of from 150° C. to 200° C. for a process time of from 6 hours to 18 hours. The neutral layer 50 that is formed has an approximate thickness of the order of several nanometers. Furthermore, it is preferable to add several mol % of hydroxyethyl methacrylate (HEMA) or glycidyl methacrylate (GMA) to the PS-r-PMMA in order to improve close adherence to the light-transmitting substrate 10. Remaining solution that has not undergone a cross-linking reaction with the light-transmitting substrate can be removed after thermal annealing by toluene ultrasonic washing or the like. Note that besides the thermally cross-linked molecule layer of PS-r-PMMA described above, a self-assembled monolayer or carbon may alternatively be used as the neutral layer.

<Pattern Formation Layer Provision Step>

The step of providing a pattern formation layer 60 performed after the step of providing the neutral layer 50 involves providing the pattern formation layer 60 on the surface of the neutral layer 50.

<<Pattern Formation Layer>>

The pattern formation layer 60 can for example be made from PS-b-PMMA, which is a block copolymer of PS and PMMA. The PS-b-PMMA is diluted in an organic solvent such as toluene and applied onto the surface of the neutral layer 50 by spin casting or the like. The pattern formation layer 60 is not in any way limited to PS-b-PMMA, and any other material may be used so long as a perpendicularly oriented lamellar structure such as described further below can be formed.

The description of spin casting conditions for the previous step also applies to spin casting conditions in the present step. Moreover, the spin casting conditions in the present step may be the same as or different from the spin casting conditions in the previous step. The film thickness of the pattern formation layer 60 can be adjusted by adjusting the organic solvent concentration, the spin casting conditions, and so forth, and is preferably adjusted in accordance with the molecular mass of the block copolymer. For example, in the case of PS-b-PMMA having a molecular mass of approximately 160,000, the period length is approximately 80 nm and the thickness of the pattern formation layer is preferably approximately 40 nm, which corresponds to roughly half of the period length, or 80 nm or 160 nm, which correspond to integral multiples of the period length. Since the period length of the block copolymer changes depending on the molecular mass, the thickness of the pattern formation layer 60 is adjusted as appropriate. Note that when PS-b-

PMMA is used for the pattern formation layer 60, the PS-b-PMMA preferably has a molecular mass of approximately 50,000 to 1,000,000.

<Fine Pattern Formation Step>

The step of forming a fine pattern is performed after the step of providing the pattern formation layer 60 and involves phase separating the pattern formation layer 60 to form a fine pattern having a lamellar structure oriented perpendicularly to the surface of the light-transmitting substrate 10 and including a plurality of curved lines that are randomly disposed at a pitch of no greater than a wavelength of light.

<<Phase Separated Structure Formation Conditions>>

No specific limitations are placed on the conditions by which a phase separated structure is formed so long as the conditions enable formation of a perpendicularly oriented lamellar structure from the pattern formation layer 60. For example, thermal annealing may be performed under a vacuum of no greater than approximately 10 kPa, at a temperature of 200° C. to 400° C., for approximately 6 hours to 18 hours. The thermal annealing can cause the pattern formation layer 60 to adopt a perpendicularly oriented lamellar structure and separate into portions 60a and portions 60b. In a situation in which the pattern formation layer 60 is made from PS-b-PMMA, the thermal annealing causes the pattern formation layer 60 to phase separate into PMMA (60a) and PS (60b). When the pattern formation layer 60 separates into the portions 60a and 60b, the pattern formation layer 60 becomes a fine pattern including a plurality of curved lines that are randomly disposed at a pitch of no greater than a wavelength of light, and, in plan view, the pattern formation 60 appears as shown, for example, in FIGS. 7A-7D; note that further explanation is provided in the Examples.

<Transfer Step>

The transfer step is performed after the step of forming the fine pattern and involves transferring the fine pattern to a surface layer portion of the light-transmitting substrate 10 in conjunction to removal of the neutral layer 50 and the pattern formation layer 60.

<<Removal of Portions 60a>>

First, the portions 60a of the phase separated pattern formation layer 60 are removed by etching or the like (Step 4E). In a situation in which the portions 60a are PMMA, the PMMA is selectively removed by, for example, $O_2$ etching. This $O_2$ etching may differ depending on the thickness of the pattern formation layer 60, but can for example be performed by loading the substrate into a reactive plasma etching device and performing etching for an appropriately adjusted etching time with an $O_2$ flow of approximately 50 sccm to 200 sccm and a gas pressure of approximately 1 Pa to 10 Pa.

<<Transfer to Light-Transmitting Substrate>>

Finally, the fine pattern formed by the portions 60b remaining after selective etching of the pattern formation layer 60 is transferred to the light-transmitting substrate 10 such that the fine pattern 10a is formed in the surface layer portion of the light-transmitting substrate 10, and the depolarizing plate 100 is obtained as a result (Step 4F). The transfer can for example be performed by $CF_4/Ar$ etching or the like in which etching is performed for an appropriately adjusted etching time with a $CF_4$ flow of approximately 10 sccm to 100 sccm, an Ar flow of approximately 2 sccm to 25 sccm, and a gas pressure of approximately 0.5 Pa to 5 Pa.

As previously explained, the amount of retardation displayed by the depolarizing plate is determined by the duty ratio, which is a ratio of the land width L of protruding portions in the fine pattern 10a and the gap width S of recess portions in the fine pattern 10a. The amount of retardation of the depolarizing plate can be adjusted by adjusting the duty ratio. Moreover, the duty ratio is most preferably 1:1 as this maximizes the amount of retardation. The duty ratio can be adjusted through adjustment of the etching time adopted in transfer to the light-transmitting substrate (refer to Reference Experimental Example 1 described further below).

The depolarizing plate 100 produced through the steps described above can be provided with a superior degree of depolarization to conventional depolarizing plates. Moreover, there is a degree of freedom in terms of the size of depolarizing plate that can be produced since pattern formation is possible without using a light-exposure mask. Furthermore, optical properties can be adjusted through the pattern shape and the inorganic materials of the light-transmitting substrate, the thin film deposited thereon, and so forth, which allows a large range of adjustment.

<Etching Mask Layer Provision Step>

The present embodiment preferably further includes a step of providing an etching mask layer. The etching mask layer provision step is performed in advance of the step of providing the neutral layer 50 and involves providing an etching mask layer on the surface of the light-transmitting substrate 10 (Steps 5A and 5B). Note that repeated explanation is omitted with regard to FIGS. 4 and 5 since Step 4A is equivalent to Step 5A, Step 4B is equivalent to Step 5C, Step 4C is equivalent to Step 5D, Step 4D is equivalent to Step 5E, Step 4E is equivalent to Step 5F, and Step 4F is equivalent to Step 5H.

<Etching Mask Layer>

When the fine pattern formed by the portions 60b of the pattern formation layer 60 is transferred to the light-transmitting substrate 10, in a situation in which an etching mask layer 40 has been provided, etching selectivity of the etching mask layer 40 and the light-transmitting substrate 10 to which the portions 60b are transferred is increased. As a result, the groove depth d of the transferred fine pattern 10a can be increased, which enables an increase in the amount of retardation displayed by the depolarizing plate. The etching mask layer described above can for example be made from aluminum (Al), titanium (Ti), chromium (Cr), silicon (Si), or nickel (Ni). Note that the fine pattern formed by the pattern formation layer 60 changes, and thus the duty ratio also changes, depending on the type and thickness of the etching mask layer. Therefore, the type and thickness are preferably selected as appropriate. The etching mask layer 40 can be formed by a normal method such as sputtering.

When the etching mask layer 40 is provided, the fine pattern formed by the portions 60b of the pattern formation layer 60 is first transferred to the etching mask layer (Steps 5F and 5G), and then the fine pattern formed in the etching mask layer 40 is transferred to the surface layer portion of the light-transmitting substrate 10. The type of gas should be appropriately selected in accordance with the material of the etching mask layer. For example, when the etching mask layer 40 is made from Al, $Cl_2/BCl_3$ etching or the like can be performed.

Figure 6:
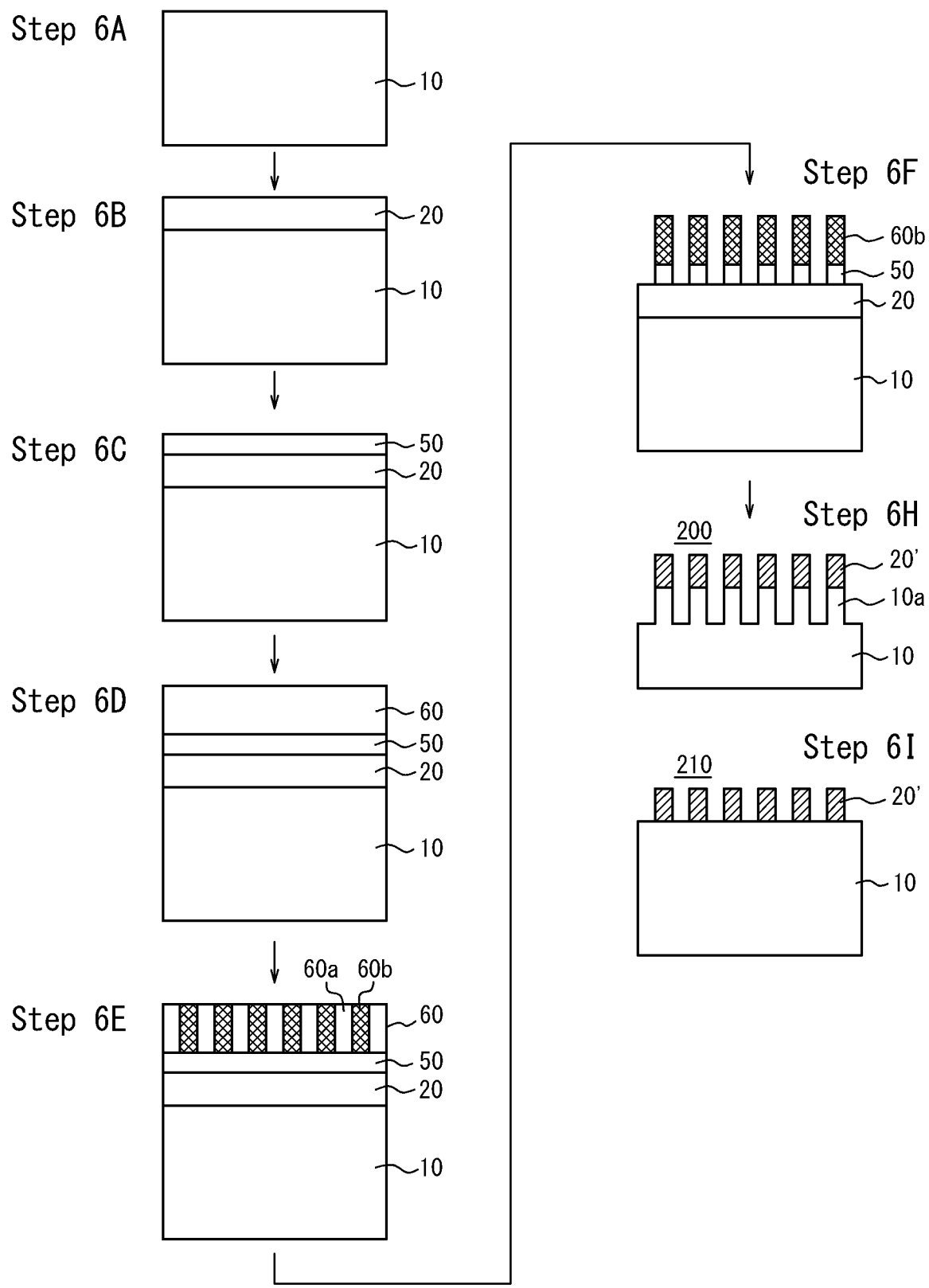
FIG. 6 illustrates a flowchart of a depolarizing plate production method according to another preferable embodiment of the present disclosure.

In an embodiment in which the previously described depolarizing plate 200 is produced, a step of providing a thin film 20 on the surface of the light-transmitting substrate 10 is preferably further included (FIG. 6). In other words, the aforementioned embodiment is a method for producing the depolarizing plate 200 that includes: a step of forming a thin film 20 on the surface of a light-transmitting substrate 10 from a material having a different refractive index from the light-transmitting substrate 10; a step of providing a neutral layer 50 above the thin film 20; a step of providing a pattern formation layer 60 on the surface of the neutral layer 50; a step of phase separating the pattern formation layer 60 to form a fine pattern that has a lamellar structure oriented perpendicularly to the surface of the light-transmitting substrate 10 and includes a plurality of curved lines randomly disposed at a pitch of no greater than a wavelength of light; and a step of transferring the fine pattern to at least the thin film 20 out of the thin film 20 and a surface layer portion of the light-transmitting substrate 10 in conjunction to removal of the neutral layer 50 and the pattern formation layer 60 (after transfer, the thin film 20 becomes the thin film 20'). Note that repeated explanation is omitted with regard to FIGS. 4 and 6 since Step 4A is equivalent to Step 6A, Step 4B is equivalent to Step 6C, Step 4C is equivalent to Step 6D, Step 4D is equivalent to Step 6E, Step 4E is equivalent to Step 6F, and Step 4F is equivalent to Step 6H.

In the method described above, the fine pattern may pass through the thin film 20 to the surface layer portion of the light-transmitting substrate 10 such as to be formed in both the thin film 20' and the surface layer portion 10a of the light-transmitting substrate, or may be formed only in the thin film 20. In the case of the latter, the previously described depolarizing plate 210 can be obtain by appropriately selecting the light-transmitting substrate 10, the thin film 20, the etching liquid, and so forth such that the light-transmitting substrate 10 functions as a so-called "etching stop layer" in the transfer step (Step 6I). Furthermore, the step of providing a thin film may be performed in the same way as in the embodiments described with reference to FIGS. 4 and 5. As described above, the amount of retardation can be adjusted by forming a material having a different refractive index on the surface of the light-transmitting substrate 10.

The following provides more detailed description of the present disclosure through Examples. However, the present disclosure is not in any way limited to the following Examples and various alterations may be made without deviating from the essence of the present disclosure.

EXAMPLES

As explained below, Examples 1 and 2 were produced as depolarizing plates according to the present disclosure and Reference Examples 1 and 2 were produced in order to confirm fine pattern shape.

Example 1

Figure 7A:
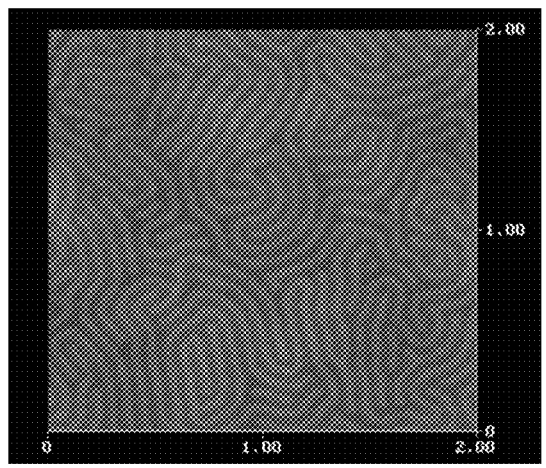
FIG. 7A is an AFM image of a fine pattern formed by a block copolymer of Example 1.

A quartz substrate was prepared and an neutral layer was formed by diluting a polymer shown below to form a 1.0 mass % toluene solution, applying the solution onto the quartz substrate by spin casting under the following conditions, subsequently performing thermal annealing, and then removing unreacted solution by toluene ultrasonic washing for 10 minutes.
Polymer
The polymer was P6413F2-SMMAHEMA ran commercially available from Polymer Source Inc. Specifically, the polymer was a random polymer composed of polystyrene (PS), polymethyl methacrylate (PMMA), and hydroxyethyl methacrylate (HEMA).
The number-average molecular weight (Mn) was 35,600, the dispersity (Mw/Mn) was 1.28, and the composition ratio was 57% PS and 2% HEMA (mol %).
Spin Casting Conditions
  Rotation speed: 4,000 rpm
  Rotation time: 30 s Thermal Annealing Conditions
  Degree of vacuum: 0.8 kPa
  Temperature: 170° C.
  Annealing time: 12 hours
Next, a polymer shown below was diluted to form a 0.91 mass % toluene solution and was applied onto the surface of the neutral layer by spin casting under the following conditions.
Polymer
The polymer was P5539F2-SMMA commercially available from Polymer Source Inc. Specifically, the polymer was a block polymer of polystyrene (PS) and polymethyl methacrylate (PMMA).
The number-average molecular weight (Mn) was 160,000 (PS: 80,000-PMMA: 80,000) and the dispersity (Mw/Mn) was 1.09.
Spin Casting Conditions
  Rotation speed: 4,000 rpm
  Rotation time: 30 s
Next, thermal annealing was performed under the following conditions to phase separate the PS-b-PMMA into a perpendicularly oriented lamellar structure.
Thermal Annealing Conditions
  Degree of vacuum: 0.8 kPa
  Temperature: 240° C.
  Annealing time: 12 hours
FIG. 7A shows a fine pattern formed by the PS after phase separation that was observed by AFM.

Next, the substrate was loaded into a plasma etching device and the PMMA was selectively removed by $O_2$ etching. The etching conditions were as follows.
$O_2$ Etching Conditions
  Discharge power: 150 W
  Bias power: 0 W
  $O_2$ flow: 100 sccm
  Gas pressure: 2 Pa
  Etching time: 100 s
Next, the PMMA fine pattern was transferred onto the quartz substrate in conjunction to removal of the PS by $CF_4$/Ar etching to obtain a depolarizing plate according to Example 1. The etching conditions were as follows.
Etching Conditions
  Discharge power: 200 W
  Bias power: 60 W
  $CF_4$ flow: 20 sccm
  Ar flow: 5 sccm
  Gas pressure: 2.0 Pa
  Etching time: 100 s Example 2

Figure 7B:
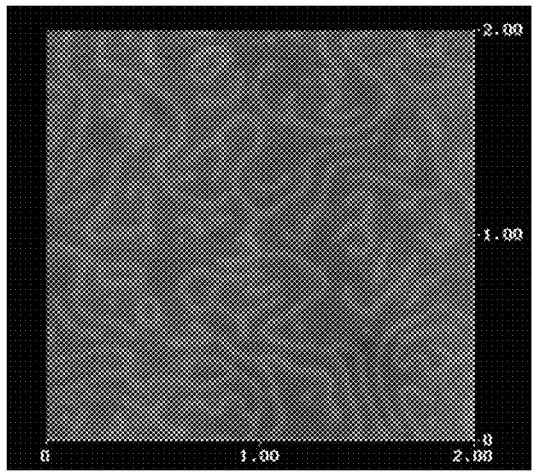
FIG. 7B is an AFM image of a fine pattern formed by a block copolymer of Example 2.

In the process described for Example 1, an etching mask layer made from Al and having a thickness of 60 nm was formed prior to formation of the neutral layer. The etching mask layer was formed by sputtering. FIG. 7B shows a fine pattern formed by the PS after phase separation that was observed by AFM.
After etching of the PMMA, $Cl_2$/$BCl_3$ etching was performed before fine pattern transfer onto the quartz substrate.
The etching conditions were as follows.
Etching Conditions
  Discharge power: 300 W
  Bias power: 60 W
  $Cl_2$ flow: 10 sccm
  $BCl_3$ flow: 5 sccm
  Gas pressure: 0.4 Pa
  Etching time: 16 s A depolarizing plate according to Example 2 was obtained with other conditions being kept the same as in Example 1.

Reference Example 1

Figure 7C:
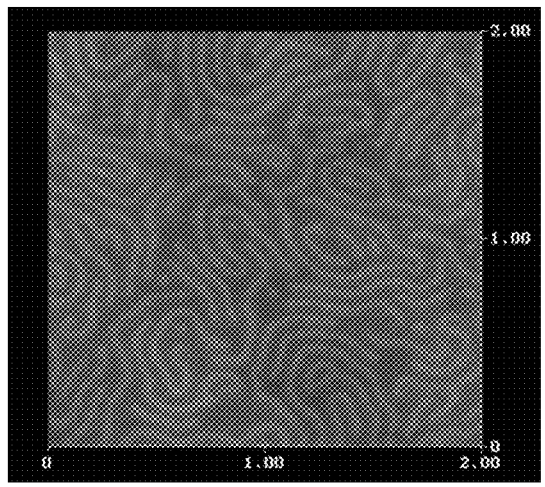
FIG. 7C is an AFM image of a fine pattern formed by a block copolymer of Example 3.

In the process described for Example 1, an etching mask layer made from Ti and having a thickness of 35 nm was formed prior to formation of the neutral layer. The etching mask layer was formed by sputtering. Operations up to phase separation were performed with other conditions kept the same as in Example 1. FIG. 7C shows a fine pattern formed by the PS after phase separation that was observed by AFM.

Reference Example 2

Figure 7D:
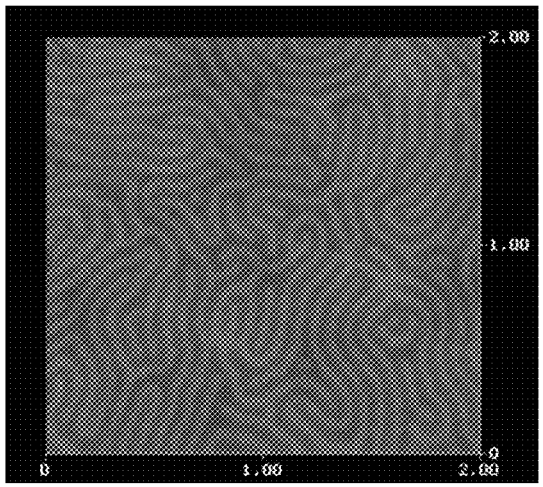
FIG. 7D is an AFM image of a fine pattern formed by a block copolymer of Example 4.

In the process described for Example 1, an etching mask layer made from Cr and having a thickness of 50 nm was formed prior to formation of the neutral layer. The etching mask layer was formed by sputtering. Operations up to phase separation were performed with other conditions kept the same as in Example 1. FIG. 7D shows a fine pattern formed by the PS after phase separation that was observed by AFM.

Figure 8:
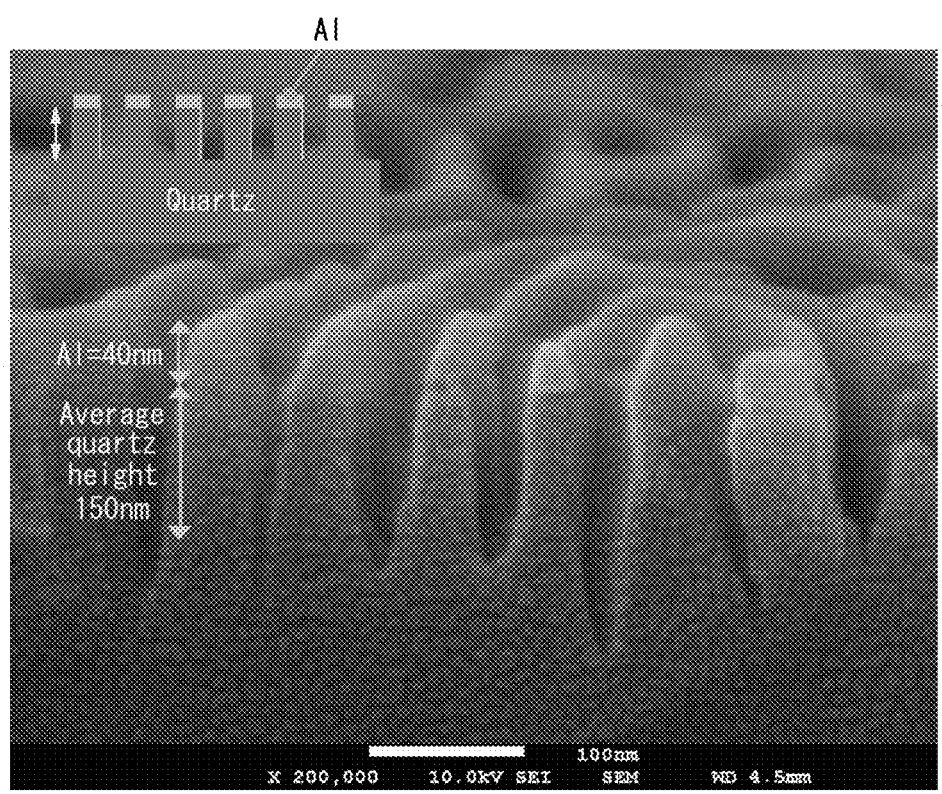
FIG. 8 is a cross-sectional SEM image of Example 2.

FIG. 8 is a cross-sectional SEM image illustrating, as a representative example, an intermediate state during transfer of the fine pattern to the surface layer portion of the quartz substrate in Example 2. As illustrated in FIG. 8, 40 nm of the Al forming the etching mask layer was still remaining in this state. The fine pattern that was present in the surface layer portion of the quartz substrate at this point had an average groove depth d of 150 nm and a pitch P of 78 mm. A ratio (duty ratio) of a gap width S between protruding portions and a width L of protruding portions formed by the quartz substrate was 1:1. Note that when Al is removed from this state, the amount of retardation R is 16 nm.

As clearly shown by FIGS. 7 and 8, as a result of the depolarizing plates in Examples 1 and 2 each having a fine pattern randomly formed throughout the surface thereof, retardation variation can be made more continuous and smooth than in a conventional depolarizing plate in which the retardation varies in steps. It was also confirmed that a random fine pattern could be formed in Reference Examples 1 and 2 in the same way as in Examples 1 and 2.

Note that the surface roughness Ra prior to neutral layer formation in Examples 1 and 2 and Reference Examples 1 and 2 was 0.302 nm, 0.852 nm, 1.368 nm, and 0.475 nm, respectively. Upon comparison of FIGS. 7A-7D, it seems that the phase separated structure is influenced more by material properties than surface roughness. Specifically, it is thought that an ideal phase separated structure can be obtained by using an etching mask material having a high melting point and a low thermal expansion coefficient (i.e., close to that of the substrate) such that the influence of changes in film quality and stress due to thermal annealing are reduced.

Reference Experimental Example 1

Reference Experimental Examples 1-1 to 1-3 were produced by, in the process described for Example 1, setting the etching time when transferring the fine pattern to the surface layer portion of the quartz substrate as 100 s, 200 s, and 300 s, respectively. SEM images of fine patterns in Reference Experimental Examples 1-1 to 1-3 are shown in FIGS. 9A-9C, respectively.

Figure 9A:
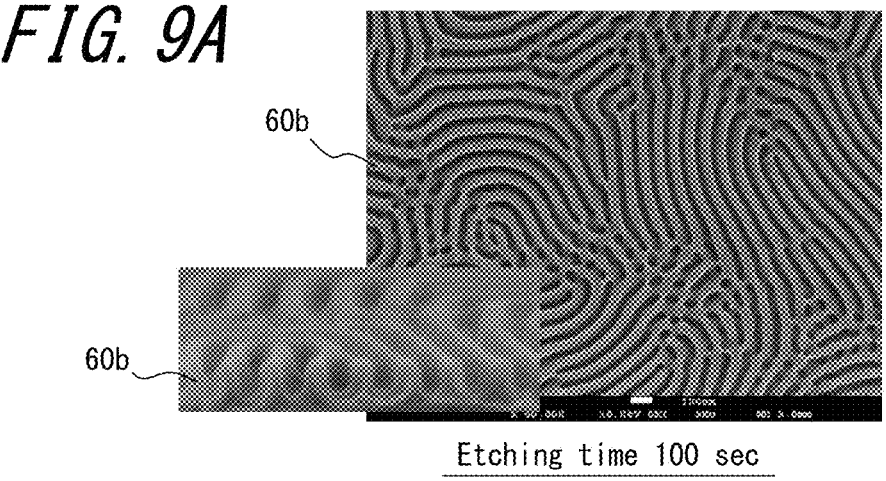
FIG. 9A is an SEM image illustrating a duty ratio of Reference Experimental Example 1-1.
Figure 9B:
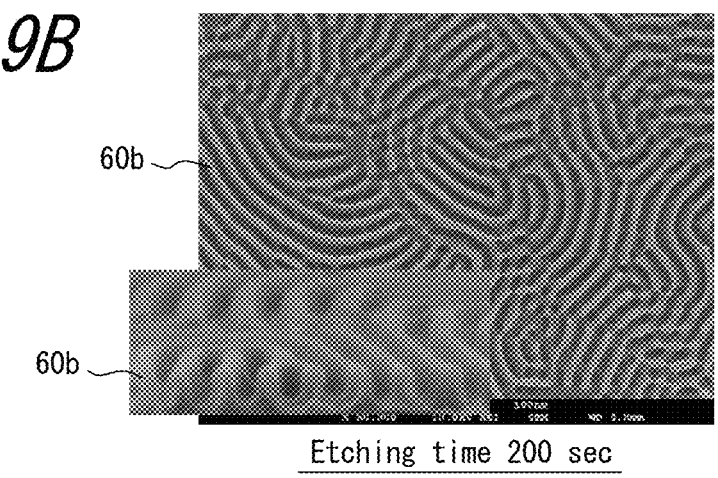
FIG. 9B is an SEM image illustrating a duty ratio of Reference Experimental Example 1-2.
Figure 9C:
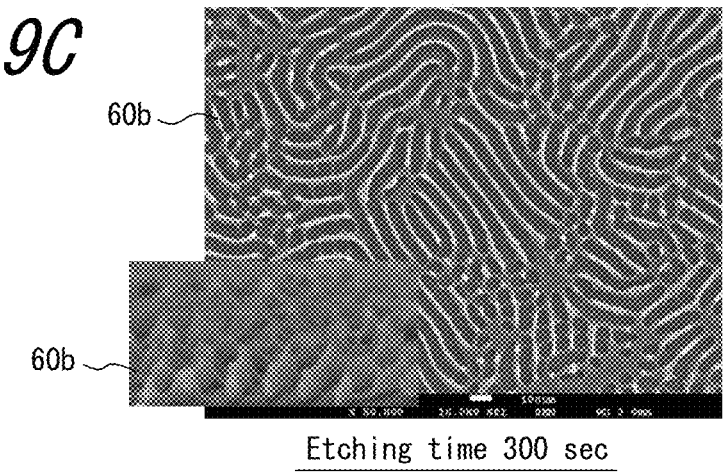
FIG. 9C is an SEM image illustrating a duty ratio of Reference Experimental Example 1-3.

FIGS. 9A-9C clearly confirm that the duty ratio, and thus also the amount of retardation R, can be adjusted through control of the etching time.

Measurement results for the duty ratio, the pitch P, and the retardation R in each of Reference Experimental Examples 1-1 to 1-3 are shown below in Table 1.

TABLE 1

| | Reference Experimental Example 1-1 | Reference Experimental Example 1-2 | Reference Experimental Example 1-3 |
|---|---|---|---|
| Etching time | 100 s | 200 s | 300 s |
| Gap and PS ratio (duty ratio) | 1:1 | 3:1 | 4:1 |
| Pitch | 78 nm | 78 nm | 78 nm |
| Retardation | 7.9 nm | 5.4 nm | 5.6 nm |

Reference Experimental Example 2

Figure 10A:
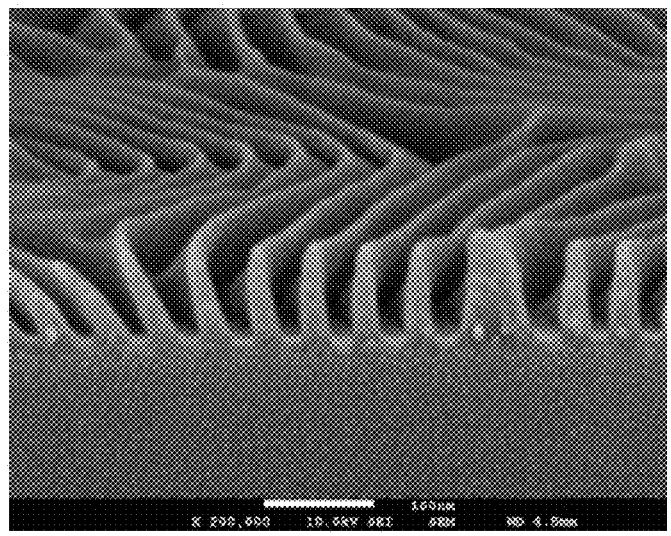
FIG. 10A is an SEM image illustrating average period length of Reference Experimental Example 2-1.
Figure 10B:
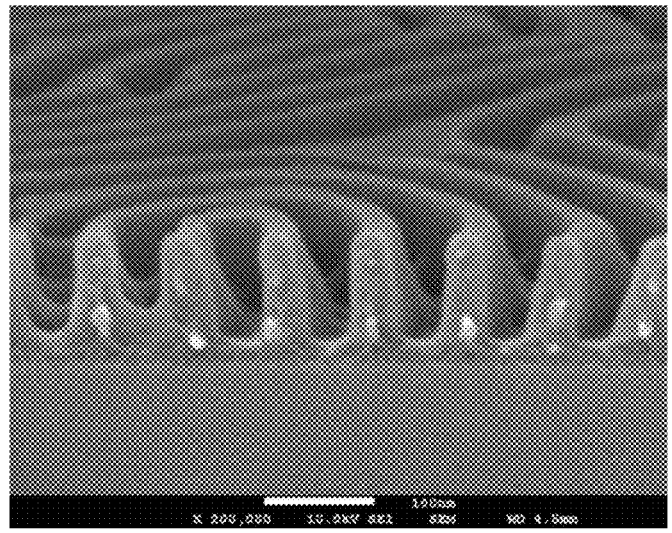
FIG. 10B is an SEM image illustrating average period length of Reference Experimental Example 2-2.

Reference Experimental Examples 2-1 and 2-2 were prepared by, in the process described for Example 1, using PS-b-PMMA having molecular masses of 66,000 and 152,000, respectively, while keeping other conditions the same. FIGS. 10A and 10B are cross-sectional SEM images respectively illustrating Reference Experimental Examples 2-1 and 2-2 after phase separation. The average period lengths in Reference Experimental Examples 1 and 2 were 48 nm and 80 nm, respectively, and the same trend for period length as described in Sang Ouk Kim, NANOLETTERS, 2009, Vol. 9, No. 6, 2300-2305 and Du Yeol Ryu, ACS NANO, 2010, Vol. 4, No. 9, 5181-5186 was confirmed.

INDUSTRIAL APPLICABILITY

The present disclosure can provide a depolarizing plate having a superior degree of depolarization, an optical device and a liquid-crystal display device including the depolarizing plate, and a depolarizing plate production method.

The invention claimed is:

1. A depolarizing plate comprising
a light-transmitting substrate having a surface layer portion in which a fine pattern is provide, wherein
the fine pattern includes a plurality of curved lines of lands each having a protruding shape and a plurality of grooves formed between the lands and each having a recessed shape composed of an air layer between the lands,
the curved lines are randomly disposed,
each pair of one of the curved lines and adjacent one of the grooves defines a distance L+S where L is a width of the curved line and S is a width of the groove,
the distance L+S is no greater than a wavelength of visible light, and
the fine pattern exhibits structural birefringence.

2. The depolarizing plate of claim 1, wherein
at least one of the plurality of curved lines includes a U-shaped curved section.

3. The depolarizing plate of claim 1, wherein
at least one of the plurality of curved lines branches.

4. The depolarizing plate of claim 1, wherein
retardation due to the structural birefringence is at least ¼ of a maximum wavelength of the light.

5. The depolarizing plate of claim 4, wherein
at least a region in which the retardation varies continuously is present in a surface of the light-transmitting substrate.
6. The depolarizing plate of claim 1, wherein
the fine pattern is formed by pattern transfer of a block copolymer.
7. The depolarizing plate of claim 1, wherein
the distance L+S is between 40 nm and 160 nm.
8. The depolarizing plate of claim 7, wherein
a ratio of S to L is from 1:1 to 4:1.
9. The depolarizing plate of claim 1, wherein
the groove depth is of the order of hundreds of nanometers.
10. A depolarizing plate comprising:
a light-transmitting substrate; and
a thin film disposed on a surface of the light-transmitting substrate and made from a material having a different refractive index from the light-transmitting substrate, wherein
a fine pattern is provided in at least the thin film out of the thin film and a surface layer portion of the light-transmitting substrate,
the fine pattern includes a plurality of curved lines of lands each having a protruding shape and a plurality of grooves formed between the lands and each having a recessed shape composed of an air layer between the lands,
the curved lines are randomly disposed,
each pair of one of the curved lines and adjacent one of the grooves defines a distance L+S where L is a width of the curved line and S is a width of the groove,
the distance L+S is no greater than a wavelength of visible light, and
the fine pattern exhibits structural birefringence.
11. The depolarizing plate of claim 10, wherein
the fine pattern is only provided in the thin film.
12. The depolarizing plate of claim 10, wherein
the fine pattern is provided in both the thin film and the surface layer portion of the light-transmitting substrate.
13. The depolarizing plate of claim 10, wherein
the thin film is formed by oblique vapor deposition or oblique sputtering.
14. The depolarizing plate of claim 10, wherein
the thin film is made from an inorganic oxide.
15. The depolarizing plate of claim 10, wherein
at least one of the plurality of curved lines includes a U-shaped curved section.
16. The depolarizing plate of claim 10, wherein
at least one of the plurality of curved lines branches.
17. The depolarizing plate of claim 10, wherein
retardation due to the structural birefringence is at least ¼ of a maximum wavelength of the light.
18. The depolarizing plate of claim 17, wherein
at least a region in which the retardation varies continuously is present in the surface of the light-transmitting substrate.
19. The depolarizing plate of claim 10, wherein
the distance L+S is between 40 nm and 160 nm.
20. The depolarizing plate of claim 19, wherein
a ratio of S to L is from 1:1 to 4:1.
21. The depolarizing plate of claim 10, wherein
the groove depth is of the order of hundreds of nanometers.

* * * * *